United States Patent
Buschka et al.

(10) Patent No.: US 11,717,922 B2
(45) Date of Patent: Aug. 8, 2023

(54) METHOD FOR SURFACE TREATMENT, ROLLER BEARING COMPONENT AND DEVICE

(71) Applicant: Schaeffler Technologies AG & Co. KG, Herzogenaurach (DE)

(72) Inventors: Martin Buschka, Herzogenaurach (DE); Silvio End, Heroldsberg (DE); André Kuckuk, Gunzenhausen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/414,515

(22) PCT Filed: Aug. 28, 2019

(86) PCT No.: PCT/DE2019/100776
§ 371 (c)(1),
(2) Date: Jun. 16, 2021

(87) PCT Pub. No.: WO2020/125842
PCT Pub. Date: Jun. 25, 2020

(65) Prior Publication Data
US 2022/0063027 A1  Mar. 3, 2022

(30) Foreign Application Priority Data
Dec. 19, 2018 (DE) .................... 10 2018 132 771.4

(51) Int. Cl.
*B23P 15/00* (2006.01)
*B24B 19/06* (2006.01)
*F16C 33/64* (2006.01)

(52) U.S. Cl.
CPC ............ *B23P 15/003* (2013.01); *B24B 19/06* (2013.01); *F16C 33/64* (2013.01); *F16C 2220/44* (2013.01); *Y10T 29/49689* (2015.01)

(58) Field of Classification Search
CPC .......... B25P 15/003; B23P 9/04; F16C 33/58; Y10T 29/49689
See application file for complete search history.

(56) References Cited

U.S. PATENT DOCUMENTS 3,735,615 A * 5/1973 Shneider ................... B23P 9/02
72/75
5,339,523 A * 8/1994 Hasegawa .......... G11B 19/2009
29/90.01

(Continued)

FOREIGN PATENT DOCUMENTS

CN     1653279 A    8/2005
CN   102933865 A    2/2013

(Continued)

OTHER PUBLICATIONS

Author: Schneider Yu G Source: "Regularization of Microgeometry of Part Surfaces" Soviet Engineering Research, PRA, Melton Mowbray, GB, vol. 11, No. 5, Jan. 1, 1991 (Jan. 1, 1991), pp. 12-16, ISSN: 0144-6622, XP000257479 Date: Jan. 1, 1991 Country: United Kingdom.

*Primary Examiner* — Sarang Afzali

(57) ABSTRACT

A method for surface treatment of a workpiece includes providing the workpiece with hardened workpiece surface, clamping the workpiece, removing material from the hardened workpiece surface with a material removal tool to produce a machined surface with first machining tracks, and rolling the machined surface with a rolling tool by overlapping the first machining tracks to produce a rolled surface with second machining tracks. A distance between the material removal tool and the rolling tool measured in an axial direction of the workpiece is varied in an oscillating manner. The material removal tool may be advanced in the axial direction at a constant speed and the rolling tool may be advanced in the axial direction at an oscillating speed, or (Continued)

the rolling tool may be advanced in the axial direction at a constant speed and the material removal tool may be advanced in the axial direction at an oscillating speed.

7 Claims, 3 Drawing Sheets

(56) References Cited

U.S. PATENT DOCUMENTS

| | | | |
|---|---|---|---|
| 5,863,239 | A | 1/1999 | Barton, II |
| 6,755,065 | B2 * | 6/2004 | Ostertag ................ B24B 39/06 29/90.01 |
| 7,389,666 | B2 | 6/2008 | Lugt |
| 7,685,717 | B2 | 3/2010 | Shibata et al. |
| 9,732,394 | B2 * | 8/2017 | Chin ........................ C23C 8/02 |
| 2010/0101526 | A1 | 4/2010 | Schaefer et al. |
| 2015/0343597 | A1 | 12/2015 | von Schleinitz |

FOREIGN PATENT DOCUMENTS

| | | |
|---|---|---|
| CN | 104968474 A | 10/2015 |
| DE | 202009014180 U1 | 2/2010 |
| EP | 1505306 A1 | 2/2005 |
| EP | 1620230 A2 | 2/2006 |
| EP | 2743032 A1 | 6/2014 |
| JP | S59219121 A | 12/1984 |
| JP | S6434601 A | 2/1989 |
| JP | H08252767 A | 10/1996 |
| JP | 2003329048 A | 11/2003 |
| JP | 2004167668 A | 6/2004 |
| JP | 2011208752 A | 10/2011 |
| WO | 2014095527 A1 | 6/2014 |
| WO | 2017086120 A1 | 5/2017 |

* cited by examiner

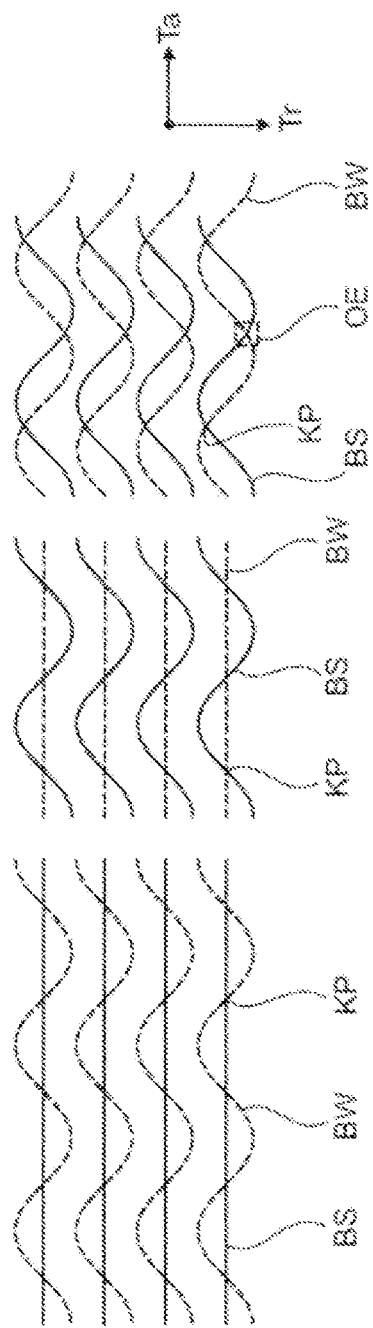

METHOD FOR SURFACE TREATMENT, ROLLER BEARING COMPONENT AND DEVICE

CROSS-REFERENCE TO RELATED APPLICATIONS

This application is the United States National Phase of PCT Appln. No. PCT/DE2019/100776 filed Aug. 28, 2019, which claims priority to German Application No. DE102018132771.4 filed Dec. 19, 2018, the entire disclosures of which are incorporated by reference herein.

TECHNICAL FIELD

The present disclosure relates to a method for the surface treatment of a workpiece, wherein a hardened workpiece surface of a workpiece is machined and rolled at the same time. The machining includes material removal and rolling is carried out in one and the same clamping setup while the workpiece rotates. The present disclosure also relates to a roller bearing component with a surface formed as a raceway for roll bodies and a device for carrying out the method.

BACKGROUND

A generic method is known from EP 1 620 230 B1. As part of this method, a surface of a machine element is first subjected to a hard turning process, which creates a roughness profile with a series of alternating ridges and grooves. The surface is then subjected to a ball calendering process, i.e., a rolling process, in order to level the ridges of the roughness profile. In the known method, a ball with a diameter between 2 mm and 13 mm is used for ball calendering. A pressure medium with a hydrostatic pressure in the range from 50 bar to 400 bar acts on the ball. In the rolling process carried out with the ball calendering tool, a ratio is set between the translational speed of the rolling tool, that is to say the ball calendering tool, and the rotational speed of the workpiece. This ratio is identical to the ratio between the translational speed of the material removal tool, that is to say the hard turning material removal tool, and the rotational speed of the workpiece during the material removal process.

Another surface treatment method, which includes a material removal process and subsequent rolling, is disclosed in U.S. Pat. No. 7,685,717 B2. This method, like the method according to EP 1 620 230 B1, is also provided for the machining of raceways of roller bearing components.

SUMMARY

The present disclosure describes further developed options of surface treatment, e.g., of roller bearing components, which have an improved relation between the achievable surface quality and manufacturing effort.

The surface treatment method assumes a hardened metallic workpiece surface. For example, it is a surface that is later to serve as a raceway for roll bodies, for example cylindrical rollers or tapered rollers. The surface is machined by material removal as part of the method and then rolled, with the material removal and the rolling taking place with the workpiece rotating in one and the same clamping setup. The machining on the one hand and the rolling on the other hand are carried out with overlapping machining tracks by changing the distance measured during the machining in the axial direction of the workpiece between the tool used for material removal and the tool used for rolling in an oscillating manner.

In comparison with conventional methods, the surface treatment method according to the disclosure causes practically no additional, or even reduced, expenditure of time, with an improved surface quality being achievable. The superimposition of various relative movements between the material removal tool and the workpiece on the one hand and between the rolling tool and the workpiece on the other hand result in numerous intersection points between the various machining tracks on the workpiece surface. Longer, uninterrupted, groove-shaped structures on the workpiece surface are avoided. For example, in the case of a rotationally symmetrical workpiece, there is not a single machining track that runs uninterrupted along the entire circumference of the workpiece.

The surface treatment, which includes material removal and subsequent rolling, takes place in one and the same clamping setup of the workpiece while the workpiece is rotating. The material removal is therefore hard turning. The subsequent rolling is also referred to as roller burnishing.

During machining, which includes material removal and roller burnishing, the distance between the material removal tool and the rolling tool, measured in the longitudinal direction of the axis of rotation of the workpiece, is varied in an oscillating manner. There are several distinct ways of creating a plurality of intersection points between the machining track of the material removal tool and the machining track of the rolling tool.

According to a first option, the material removal tool is advanced at a constant speed, whereas the rolling tool is advanced at an oscillating speed.

According to a second option, the rolling tool is advanced at a constant speed, whereas the material removal tool is advanced at an oscillating speed.

In this case, the circumference of the surface of the workpiece to be machined is an integral multiple of the wavelength of the machining track of the material removal tool.

According to a third option, both the material removal tool is advanced at an oscillating speed and the rolling tool is advanced at a different oscillating speed in the longitudinal direction of the axis of rotation of the workpiece.

In this case too, the circumference of the surface of the workpiece to be machined may be an integral multiple of the wavelength of the machining track of the material removal tool. On the one hand, this ensures that no surface areas that have not been machined by the material removal tool remain on the workpiece surface. On the other hand, unnecessarily frequent traversing of surface areas of the workpiece with the material removal tool is avoided.

According to a fourth option, a feed direction of the rolling tool is reversed in an oscillating manner during machining, while a feed direction of the material removal tool is maintained.

According to a fifth option, a feed direction of the material removal tool is reversed in an oscillating manner during machining, while a feed direction of the rolling tool is maintained.

According to a sixth option, a feed direction of the material removal tool is reversed in an oscillating manner and a feed direction of the rolling tool is reversed in an oscillating manner during machining.

In the fourth to sixth option, a large number of points of intersection or crossing points can be generated between the machining track of the material removal tool and the machining track of the rolling tool.

It is possible to combine the oscillation of the feed rate of the material removal tool and/or of the rolling tool according to the first to third options with the oscillation of the feed direction of the material removal tool and/or of the rolling tool according to the fourth to sixth options.

As far as the generation of the oscillations of the tools used for cutting and rolling is concerned, different designs of a device used for this purpose can be fundamentally distinguished from one another:

Thus, a device including a material removal tool and a rolling tool is suitable for carrying out the method according to the disclosure, in which the material removal tool and/or the rolling tool can be moved at an oscillating feed rate. An independent setting and variation of the feed rate of the material removal tool and/or of the rolling tool is required.

Both tools, i.e., the tool used for material removal on the one hand and the rolling tool on the other, are independently clamped in the machine that carries out the method according to the disclosure so that the necessary oscillation of the feed rate can take place from the machine axes of this machine.

The disclosure also includes a device for carrying out the method, having a material removal tool and a rolling tool. The material removal tool and/or the rolling tool include a carriage, which allows for an oscillating reversal of the feed direction of the material removal tool and/or of the rolling tool.

The device in which the material removal tool and the rolling tool are attached is equipped with at least one oscillation unit for the material removal tool and/or the rolling tool, driving the carriage(s).

A device in which both an independent setting and variation of the feed rate of the material removal tool and/or the rolling tool is possible and, furthermore, the material removal tool and/or the rolling tool include a carriage that allows for oscillating reversal of the feed direction of the material removal tool and/or of the rolling tool.

Regardless of the way in which it is integrated into the machine provided for surface treatment, the rolling tool has, for example, a ball as the rolling element. In principle, rotationally symmetrical bodies of a different shape, for example cylindrical rollers or barrel rollers, can also be used as the rolling element.

BRIEF DESCRIPTION OF THE DRAWINGS

Below, several exemplary embodiments of the disclosure are explained by way of example by means of the drawings. In the figures:

FIGS. 3 to 5 show different variants of machining tracks which can be generated with the device according to FIG. 2.

DETAILED DESCRIPTION

Figure 1:
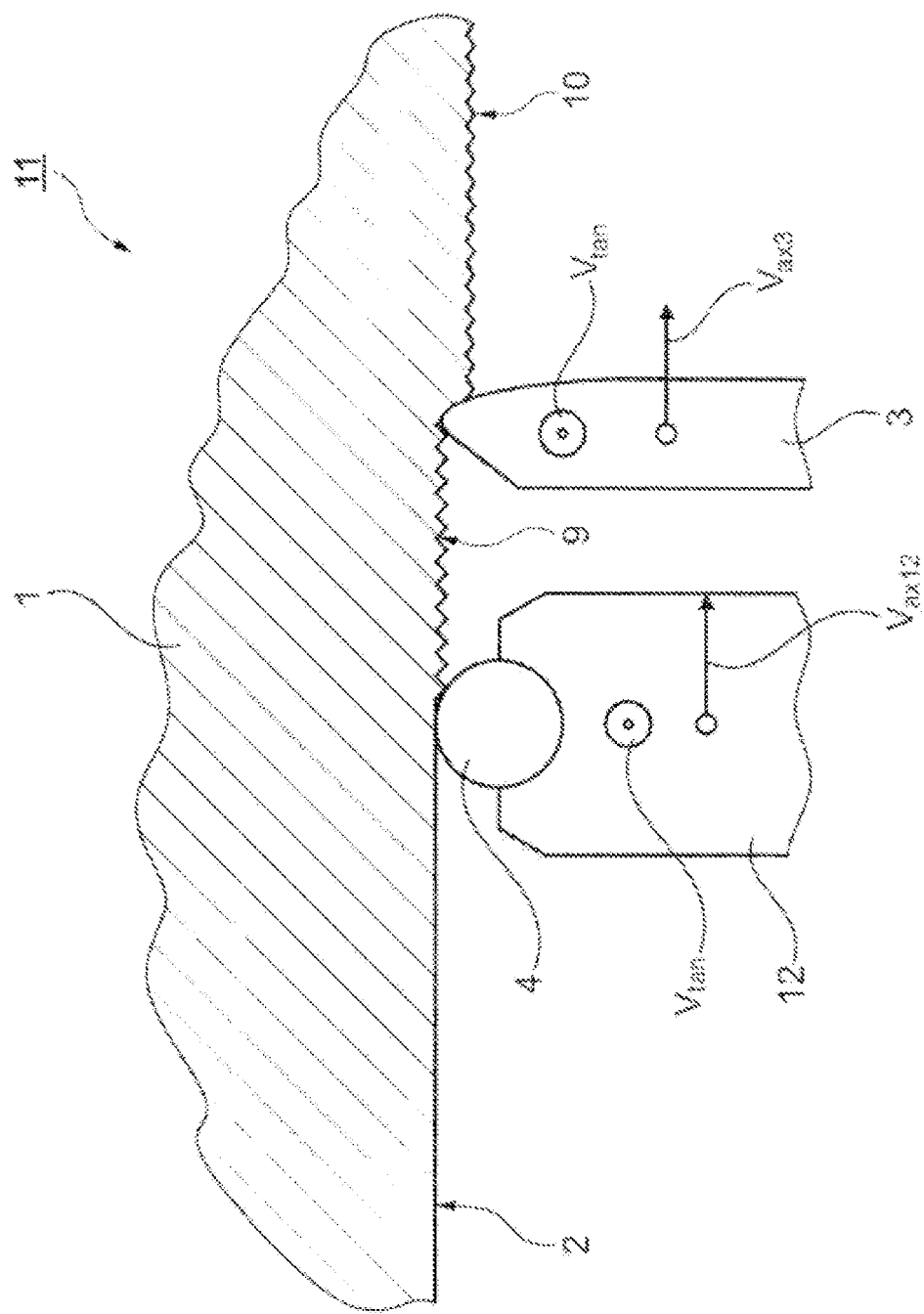
FIG. 1 shows a schematic representation of a section of a first device for surface treatment of a workpiece.

A first device, identified as a whole by the reference symbol 11, includes a material removal tool 3 in the form of a turning tool and a rolling tool 12. The tools 3, 12 are provided for the simultaneous machining of a workpiece 1 (shown only partially and in section), namely a bearing ring of a roller bearing. In the process, a workpiece surface 2 is generated which is intended to function as a roll body raceway within the roller bearing to be produced.

The starting point of the method that can be carried out with the device 11 is an already hardened workpiece surface 10. The hard turning by means of the turning tool results in a surface 9 which has a typical structure produced by turning. The process of turning takes place with a translational speed $V_{ax3}$ and a tangential speed $V_{tan}$. The direction of the translational speed $V_{ax3}$ corresponds to the alignment of the axis of rotation of the workpiece 1, i.e., its axial direction.

The rolling tool 12 is arranged offset to the material removal tool 3 in the longitudinal direction of the axis of rotation of the workpiece 1 and includes a ball as the rolling element 4. The ball is subjected to the pressure of a hydraulic medium in a manner known per se. During the machining of the workpiece 1, the rolling tool 12, including the ball, is advanced relative thereto at a translational speed $V_{ax12}$, which can be varied in various ways relative to the translational speed $V_{ax3}$, as will be explained in more detail below. In contrast, the tangential speed of the rolling tool 12 relative to the workpiece 1, denoted by $V_{tan}$, corresponds to the tangential speed $V_{tan}$ of the material removal tool 3. This applies in cases in which the surface to be machined of the workpiece 1 is cylindrical, as outlined in the exemplary embodiment. In the case of a conical or spherically curved surface of the workpiece 1, the tangential speeds deviate from one another without fundamentally changing the machining process. In any case, the finished surface 2 is produced by the rolling tool 12.

Both tools 3, 12, i.e., the material removal tool 3, on the one hand, and the rolling tool 12, on the other hand, are independently clamped in the first device 11, which carries out the method according to the disclosure, so that the necessary oscillation of the feed rate takes place from the machine axes. Here, the feed rate $V_{ax3}$ of the material removal tool 3 and/or the feed rate $V_{ax12}$ of the rolling tool 12 can be changed in an oscillating manner in order to specifically influence the formation of the intersection points in the area of the machining tracks that are formed during turning and rolling.

Figure 2:
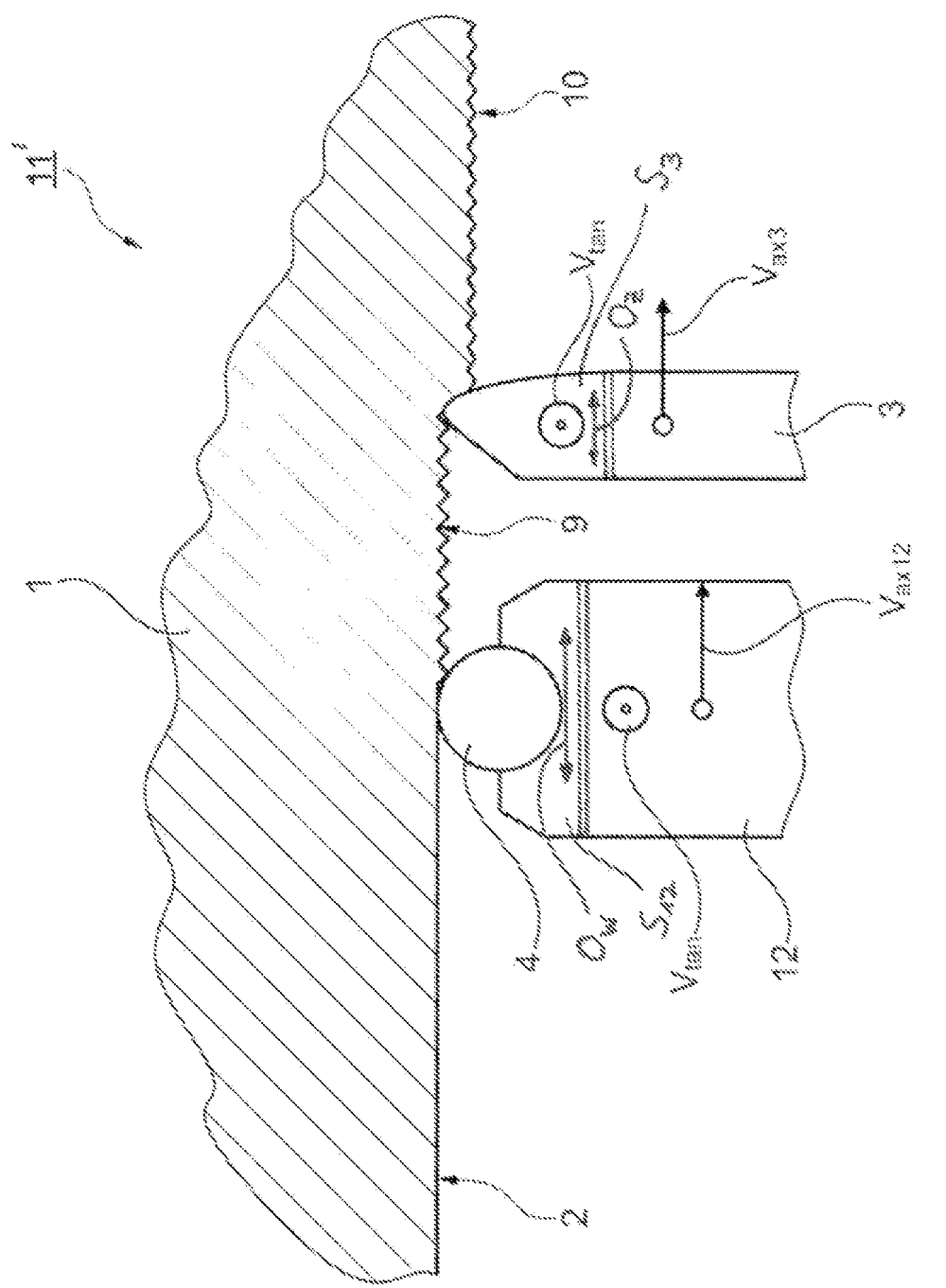
FIG. 2 shows a schematic representation of a section of another device for surface treatment of a workpiece.

FIG. 2 now shows a further device, identified as a whole by the reference symbol 11', comprising a material removal tool 3 in the form of a turning tool and a rolling tool 12. The same reference characters as in FIG. 1 indicate identical elements.

The starting point of the method that can be carried out with the further device 11' is likewise an already hardened workpiece surface 10. The hard turning by means of the turning tool results in a surface 9 which has a typical structure produced by turning. The process of turning takes place with a translational speed $V_{ax3}$ and a tangential speed $V_{tan}$. The direction of the translational speed $V_{ax3}$ corresponds to the alignment of the axis of rotation of the workpiece 1, i.e., its axial direction.

The rolling tool 12 is arranged offset to the material removal tool 3 in the longitudinal direction of the axis of rotation of the workpiece 1 and includes a ball as the rolling element 4. The ball is subjected to the pressure of a hydraulic medium in a manner known per se. During the machining of the workpiece 1, the rolling tool 12, including the ball, is advanced relative thereto at a translational speed $V_{ax12}$, which can be varied in various ways relative to the translational speed $V_{ax3}$, as will be explained in more detail below. In contrast, the tangential speed of the rolling tool 12 relative to the workpiece 1, denoted by $V_{tan}$, corresponds to the tangential speed $V_{tan}$ of the material removal tool 3. This applies in cases in which the surface to be machined of the workpiece 1 is cylindrical, as outlined in the exemplary embodiment. In the case of a conical or spherically curved surface of the workpiece 1, the tangential speeds deviate from one another without fundamentally changing the machining process. In any case, the finished surface 2 is produced by the rolling tool 12.

The material removal tool 3, on the one hand, and the rolling tool 12, on the other hand, each comprise a carriage $S_3$, $S_{12}$ which, in accordance with its deflectability, allows for an oscillating reversal of the feed direction (here from left to right in the picture) of the material removal tool 3 and the rolling tool 12. The further device 11', in which the material removal tool 3 and the rolling tool 12 are attached, is equipped with two oscillation units which excite each of the two carriages $S_3$, $S_{12}$ to an oscillatory movement Ow, Oz in the horizontal direction.

Thus, the position of the material removal tool 3 relative to the workpiece 1 can be changed—caused by the oscillation of the carriage $S_3$—in the horizontal direction so that areas already machined with the turning tool come again into engagement with the turning tool.

Furthermore, the position of the rolling tool 12 relative to the workpiece 1 can be changed—caused by the oscillation of the carriage $S_{12}$ in the horizontal direction so that areas already traversed by the rolling tool 12 again come into engagement with the rolling tool 12.

As a result, the distance between the material removal tool 3 and the rolling tool 12 here can also be changed in an oscillating manner in order to specifically influence the formation of the intersection points in the area of the machining tracks that are formed during turning and rolling.

Of course, a device according to the disclosure can also be embodied with only one of the carriages $S_3$, $S_{12}$. An embodiment of a device, not shown in FIGS. 1 and 2, according to a combination of the embodiment according to FIG. 1 and the embodiment according to FIG. 2 is also possible.

In FIGS. 3 to 5, various machining tracks BW, BS are sketched, generated by the rolling tool 12 or by the material removal tool 3 on the finished workpiece surface 2, using a further device 11' according to FIG. 2. The tangential direction designated by Ta corresponds to the direction in which the tangential velocity $V_{tan}$ is to be measured. The translational direction Tr, orthogonal thereto, corresponds to the longitudinal direction of the axis of rotation of the workpiece 1, i.e., the direction in which the speeds $V_{ax3}$, $V_{ax12}$ are to be measured.

In the case of FIG. 3, the material removal tool 3 is advanced at a constant translational speed $V_{ax3}$ during hard turning. In contrast thereto, the rolling tool 12 performs oscillations in the translational direction Tr. In the present case, these oscillations are approximately sinusoidal. In a modified execution of the method, it could be, for example, zigzag-shaped tracks.

As a result, numerous crossing points KP arise between the machining track BS of the material removal tool 3 and the machining track BW of the rolling tool 12. Depending on the machining parameters, the machining tracks BS, BW on the finished surface 2 of the workpiece 1 can be weak or no longer recognizable by conventional means. By controlling the device 11', however, the machining tracks BS, BW are predetermined in a defined manner in all cases. This also applies to the machining variants according to FIGS. 4 and 5.

In the case of FIG. 4, the material removal tool 3 performs oscillations in the translational direction Tr. In contrast, the rolling tool 12 in this case moves at a constant translational speed $V_{ax12}$ with respect to the workpiece 1. This creates an overall helically wound shape of the machining track BW, whereas an oscillation in the axial direction Tr, i.e., in the direction of the axis of rotation of the workpiece 1, is superimposed on the machining track BS of the helical shape.

In the case outlined in FIG. 5, there is both an oscillation of the material removal tool 3 and an oscillation of the rolling tool 12, each in the translational direction Tr. In this case, too, numerous crossing points KP arise between the different machining tracks BS, BW. Each crossing point KP lies within a surface element OE, in which none of the machining tracks BS, BW run exactly in the tangential direction Ta. The frequency with which the translational speed $V_{ax3}$ oscillates in the case of FIG. 5 is identical to the frequency with which the translational speed $V_{ax12}$ oscillates. In an alternative, other ratios between the frequencies mentioned can also be selected. In any case, the frequency with which the translational speed $V_{ax3}$, $V_{ax12}$ of at least one of the tools 3, 12 oscillates is higher than the frequency with which the workpiece 1 rotates.

REFERENCE NUMERALS

1 Workpiece, bearing ring
2 Workpiece surface, finished
3 Material removal tool
4 Ball, rolling element
9 Surface, hard turned, but not yet rolled
10 Workpiece surface, hardened, otherwise not yet further processed
11 Device 11' Device
12 Rolling tool
S3 Carriage on the material removal tool
S12 Carriage on the rolling tool
BS Machining track of the material removal tool
BW Machining track of the rolling tool
KP Crossing point
OE Surface element
Oz Oscillation movement of the carriage S3
Ow Oscillation movement of the carriage S12
Tr Translational direction, axial direction
Ta Tangential direction
Vax3 Translational speed of the material removal tool
Vax12 Translational speed of the rolling tool
V tan Tangential speed

The invention claimed is:

1. A method for surface treatment of a workpiece, the method comprising:
   providing the workpiece, the workpiece comprising a hardened workpiece surface;
   providing a material removal tool and a rolling tool, the rolling tool being independently clamped relative to the material removal tool and arranged at a distance offset from the material removal tool in an axial direction of the workpiece;
   clamping the workpiece;
   simultaneously machining the workpiece by:
     removing material from the hardened workpiece surface with the material removal tool to produce a machined surface with first machining tracks; and
     rolling the machined surface with the rolling tool by overlapping the first machining tracks to produce a rolled surface with second machining tracks, wherein the distance between the material removal tool and the rolling tool measured in the axial direction of the workpiece is varied in an oscillating manner.

2. The method of claim 1, wherein the material removal tool is advanced in the axial direction at a constant speed and the rolling tool is advanced in the axial direction at an oscillating speed.

3. The method of claim 1, wherein the rolling tool is advanced in the axial direction at a constant speed and the material removal tool is advanced in the axial direction at an oscillating speed.

4. The method of claim 1, wherein the rolling tool is advanced in the axial direction at a first oscillating speed and the material removal tool is advanced in the axial direction at a second oscillating speed, different than the first oscillating speed.

5. The method of claim 1, wherein:
a feed direction of the rolling tool is reversed in an oscillating manner while a feed direction of the material removal tool is maintained; or
a feed direction of the material removal tool is reversed in an oscillating manner while a feed direction of the rolling tool is maintained.

6. The method of claim 1, wherein:
a feed direction of the material removal tool is reversed in an oscillating manner; and
a feed direction of the rolling tool is reversed in an oscillating manner.

7. A method for surface treatment of a workpiece, the method comprising:
providing the workpiece, the workpiece comprising a hardened workpiece surface;
providing a material removal tool and a rolling tool, the rolling tool being independently clamped relative to the material rolling tool and arranged at a distance offset from the material removal tool in an axial direction of the workpiece;
clamping the workpiece;
simultaneously machining the workpiece by:
removing material from the hardened workpiece surface with the material removal tool to produce a machined surface with first machining tracks; and
rolling the machined surface with the rolling tool by overlapping the first machining tracks to produce a rolled surface with second machining tracks, wherein a feed direction of the material removal tool or the rolling tool in the axial direction of the workpiece is reversed in an oscillating manner.

* * * * *